US009143957B2

(12) United States Patent
Sadek et al.

(10) Patent No.: US 9,143,957 B2
(45) Date of Patent: Sep. 22, 2015

(54) MITIGATING CROSS-DEVICE INTERFERENCE

(71) Applicant: QUALCOMM Incorporated, San Diego, CA (US)

(72) Inventors: Ahmed K. Sadek, San Diego, CA (US); Tamer Adel Kadous, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 185 days.

(21) Appl. No.: 13/762,107

(22) Filed: Feb. 7, 2013

(65) Prior Publication Data

US 2013/0225149 A1     Aug. 29, 2013

Related U.S. Application Data

(60) Provisional application No. 61/603,181, filed on Feb. 24, 2012, provisional application No. 61/602,816, filed on Feb. 24, 2012.

(51) Int. Cl.
| | |
|---|---|
| *H04W 16/14* | (2009.01) |
| *H04W 24/02* | (2009.01) |
| *H04W 28/22* | (2009.01) |
| *H04L 1/00* | (2006.01) |
| *H04W 92/02* | (2009.01) |

(52) U.S. Cl.
CPC ............. *H04W 24/02* (2013.01); *H04L 1/0002* (2013.01); *H04W 28/22* (2013.01); *H04W 92/02* (2013.01)

(58) Field of Classification Search
USPC ........ 455/61, 62, 63.1–63.4, 67–13, 69, 41.2, 455/42, 44, 501
See application file for complete search history.

(56) References Cited

U.S. PATENT DOCUMENTS

| | | | |
|---|---|---|---|
| 6,690,944 B1 * | 2/2004 | Lee et al. | 455/522 |
| 8,160,629 B2 * | 4/2012 | Mate et al. | 455/450 |
| 8,189,453 B2 | 5/2012 | Monogioudis et al. | |
| 8,386,876 B2 | 2/2013 | Khoshnevis et al. | |
| 8,830,934 B2 | 9/2014 | Banister et al. | |
| 9,031,040 B2 * | 5/2015 | Sha et al. | 370/331 |
| 2003/0126492 A1 | 7/2003 | Cavin | |
| 2005/0094675 A1 | 5/2005 | Bhushan et al. | |
| 2008/0200124 A1* | 8/2008 | Capretta et al. | 455/41.3 |
| 2009/0197631 A1 | 8/2009 | Palanki et al. | |

(Continued)

FOREIGN PATENT DOCUMENTS

| | | |
|---|---|---|
| EP | 1503555 A1 | 2/2005 |
| EP | 2037617 A2 | 3/2009 |

(Continued)

OTHER PUBLICATIONS

Co-pending U.S. Appl. No. 14/025,713, filed Sep. 12, 2013.

(Continued)

*Primary Examiner* — Dai A Phuong
(74) *Attorney, Agent, or Firm* — Seyfarth Shaw LLP

(57) ABSTRACT

A device in a wireless system may determine when communications of a first radio access technology (RAT) experience interference from communications of a second RAT and may alter the communications of at least the first RAT or the second RAT to reduce the interference. In some instances, altering the communications include controlling a transmission rate to the second RAT based at least on a determined channel capacity.

24 Claims, 7 Drawing Sheets

(56) References Cited

U.S. PATENT DOCUMENTS

| | | |
|---|---|---|
| 2009/0203372 A1 | 8/2009 | Horn et al. |
| 2009/0279631 A1 | 11/2009 | Chen et al. |
| 2010/0037112 A1 | 2/2010 | Graumann |
| 2010/0197235 A1* | 8/2010 | Wilhelmsson ............. 455/63.3 |
| 2010/0273500 A1* | 10/2010 | Dominguez Romero et al. ............. 455/452.2 |
| 2011/0021153 A1 | 1/2011 | Safavi |
| 2011/0045765 A1 | 2/2011 | To et al. |
| 2011/0292884 A1 | 12/2011 | Li et al. |
| 2011/0319084 A1 | 12/2011 | Meshkati et al. |
| 2012/0020279 A1 | 1/2012 | Kim et al. |
| 2012/0071106 A1 | 3/2012 | Kadous et al. |
| 2012/0164948 A1* | 6/2012 | Narasimha et al. ......... 455/63.1 |
| 2012/0207040 A1 | 8/2012 | Comsa et al. |
| 2012/0257519 A1 | 10/2012 | Frank et al. |
| 2013/0065600 A1* | 3/2013 | Lim ............................. 455/450 |
| 2013/0166983 A1 | 6/2013 | Graumann |
| 2013/0208587 A1* | 8/2013 | Bala et al. ..................... 370/230 |
| 2014/0071894 A1 | 3/2014 | Kairouz et al. |
| 2014/0293959 A1* | 10/2014 | Singh et al. ................... 370/331 |

FOREIGN PATENT DOCUMENTS

| | | |
|---|---|---|
| EP | 2413640 A1 | 2/2012 |
| WO | 2006081574 A1 | 8/2006 |
| WO | 2007123366 A2 | 11/2007 |

OTHER PUBLICATIONS

International Search Report and Written Opinion—PCT/US2013/025410—ISA/EPO—Jun. 18, 2013.

Gan X., et al., "Instantaneous packet information based on-demand adaptive retransmission for HARQ", Military Communications Conference, 2010—MILCOM 2010, IEEE, Piscataway, NJ, USA, Oct. 31, 2010, pp. 1496-1501, XP031843745, ISBN: 978-1-4244-8178-1.

Liu F., et al., "Reliability-based hybrid ARQ with reduced feedback overhead", Communications Technology and Applications, 2009, ICCTA '09. IEEE International Conference on, IEEE, Piscataway, NJ, USA, Oct. 16, 2009, pp. 682-686, XP031577471, ISBN: 978-1-4244-4816-6 the whole document.

Tripathi V., et al., "Reliability-based type II hybrid ARQ schemes", New Frontiers in Telecommunications: 2003 IEEE International Conference on Communications; ICC 2003; May 11-15, 2003, Anchorage, Alaska, USA; IEEE International Conference on Communications, IEEE Operations Center, Piscataway, NJ, vol. 4, May 11, 2003, pp. 2899-2903, XP010642975, DOI: 10.1109/Icc.2003.1204563, ISBN: 978-0/7803-7802-5, Sections I, II, IV, V.

* cited by examiner

MITIGATING CROSS-DEVICE INTERFERENCE

CROSS REFERENCE TO RELATED APPLICATION

This application claims the benefit under 35 U.S.C. §119 (e) to U.S. provisional patent application No. 61/603,181, filed Feb. 24, 2012 in the names of SADEK et al., and U.S. provisional patent application No. 61/602,816, filed Feb. 24, 2012 in the name of KADOUS, the disclosures of which are expressly incorporated herein by reference in their entireties.

BACKGROUND

1. Field

Aspects of the present disclosure relate generally to wireless communication systems, and more particularly to mitigating interference between devices operating on different communication networks but in close proximity to each other.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to one aspect of the present disclosure, a method for wireless communication includes determining when communications of a first radio access technology (RAT) experience interference from communications of a second RAT. The method may also include altering the communications of at least the first RAT or the second RAT to reduce the interference, in which the altering includes controlling a transmission rate to the second RAT based at least on a determined channel capacity.

According to another aspect of the present disclosure, an apparatus for wireless communication includes means for determining when communications of a first radio access technology (RAT) experience interference from communications of a second RAT. The apparatus may also include means for altering the communications of at least the first RAT or the second RAT to reduce the interference, in which the altering means includes means for controlling a transmission rate to the first RAT based at least on a determined channel capacity.

According to one aspect of the present disclosure, a computer program product for wireless communication in a wireless network includes a computer readable medium having non-transitory program code recorded thereon. The program code includes program code to determine when communications of a first radio access technology (RAT) experience interference from communications of a second RAT. The program code also includes program code to alter the communications of at least the first RAT or the second RAT to reduce the interference, in which the program code to alter includes program code to control a transmission rate to the first RAT based at least on a determined channel capacity.

According to one aspect of the present disclosure, an apparatus for wireless communication includes a memory and a processor(s) coupled to the memory. The processor(s) is configured to determine when communications of a first radio access technology (RAT) experience interference from communications of a second RAT. The processor(s) is further configured to alter the communications of at least the first RAT or the second RAT to reduce the interference, in which the at least one processor configured to alter includes the at least one processor configured to control a transmission rate to the first RAT based at least on a determined channel capacity.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
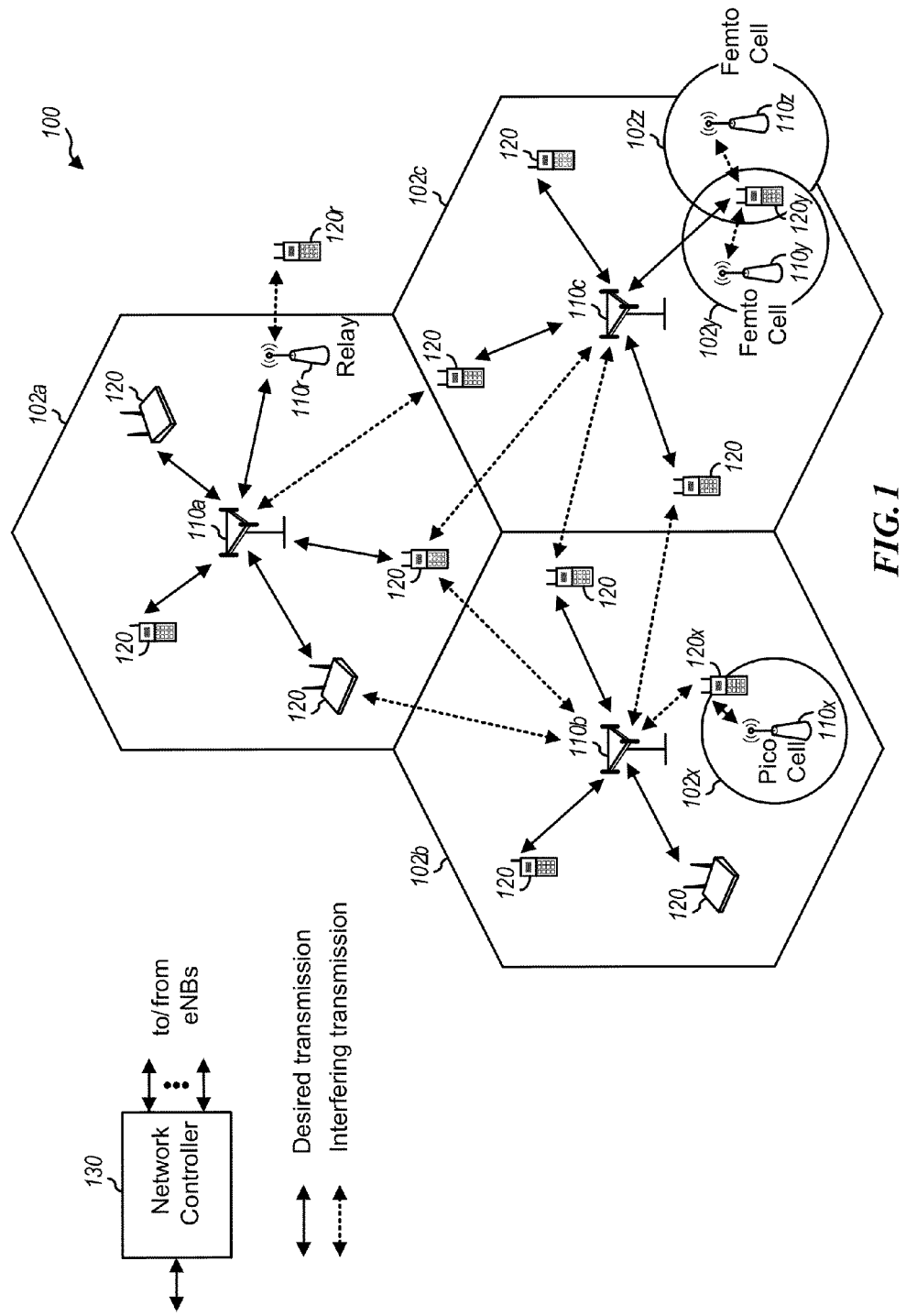
FIG. 1 is a block diagram conceptually illustrating an example of a telecommunications system.

FIG. 1 shows a wireless communication network 100, which may be an LTE-A network, and may support different LTE-TDD configurations in neighboring regions and/or adjacent carriers. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. In addition, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time. The techniques described herein may be used for synchronous operations.

In one aspect, the wireless network 100 may support Frequency Division Duplex (FDD) or Time Division Duplex (TDD) modes of operation. The techniques described herein may be used for TDD operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
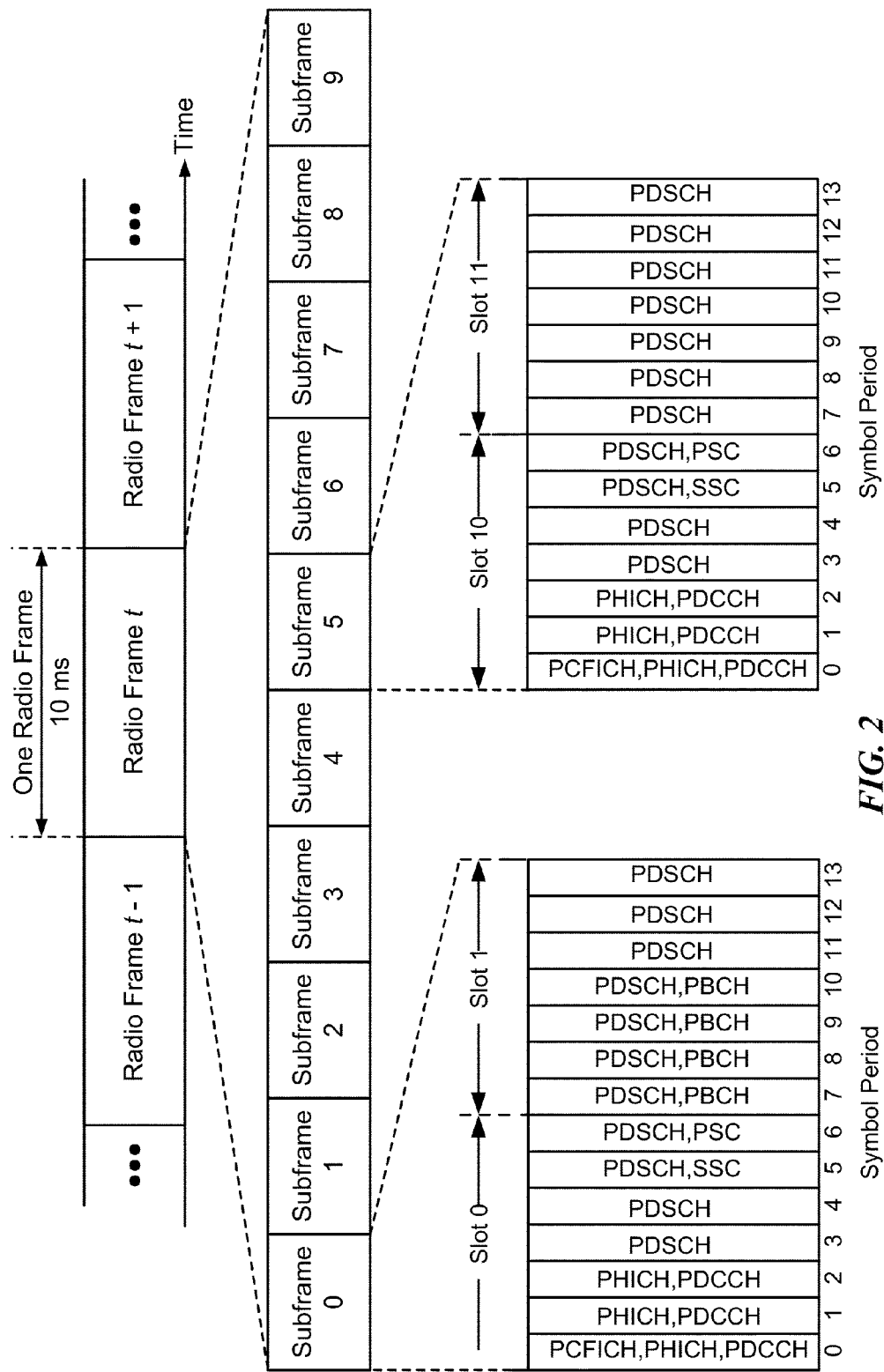
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
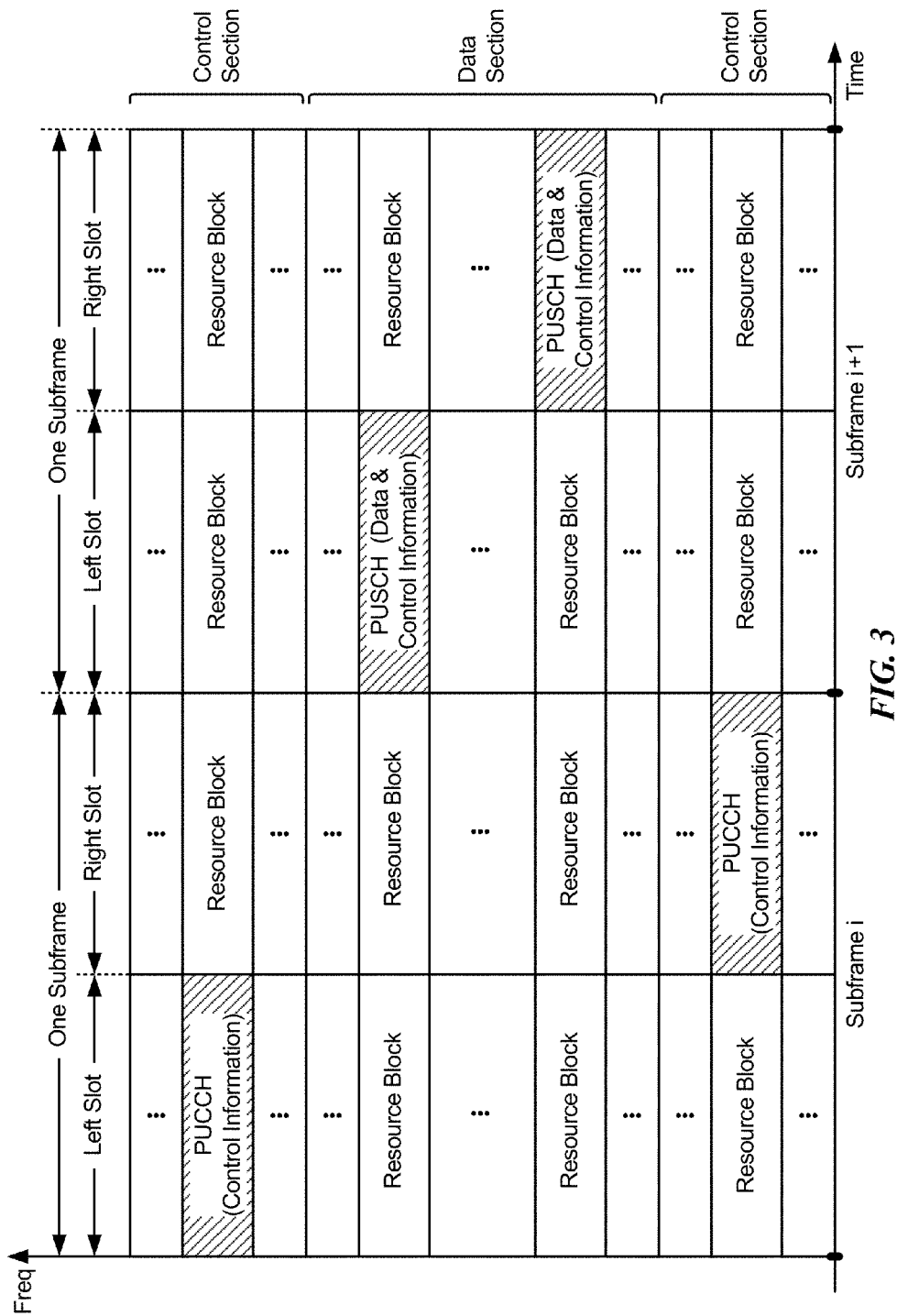
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
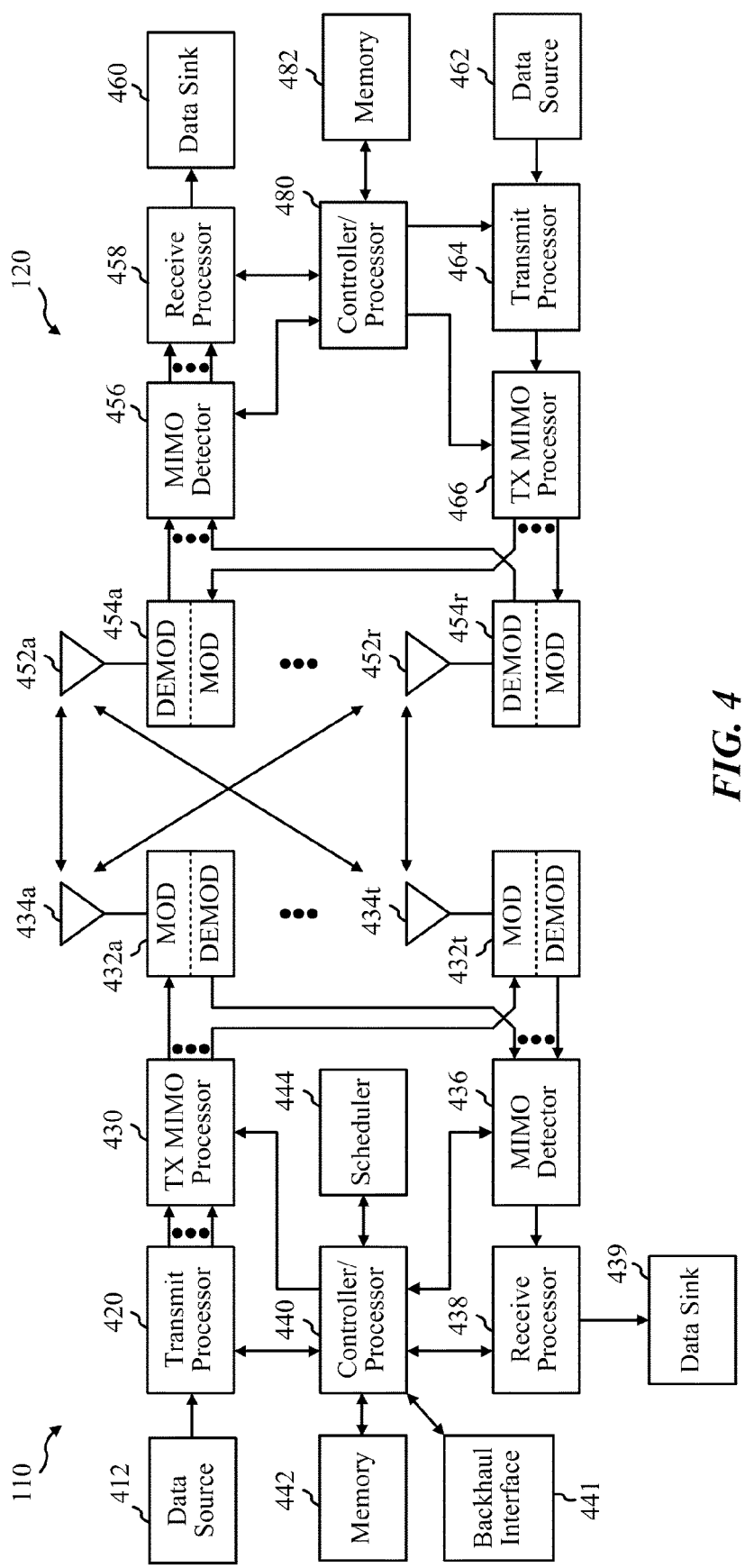
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an backhaul interface 441, such as an X2 interface.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 8 and/or other processes for the techniques described herein. The memories 442 and 482 may store data and program codes for the base station 110 and the UE 120, respectively. A scheduler 444 may schedule UEs for data transmission on the downlink and/or uplink.

When communications of a single radio access technology (RAT), or different RATs in a proximate communication spectrum are operating at the same time, potential interference between RATs may occur. For example, if one RAT is attempting to receive communications at the same time another device is transmitting, and both RATs are using the same or proximate portions of a communication spectrum, the receiving RAT may experience interference. Put another way, potential interference between devices may occur when two RATs are operating on adjacent channels or co-channels without enough guard band. The potential interference may be severe and mutual.

Figure 5:
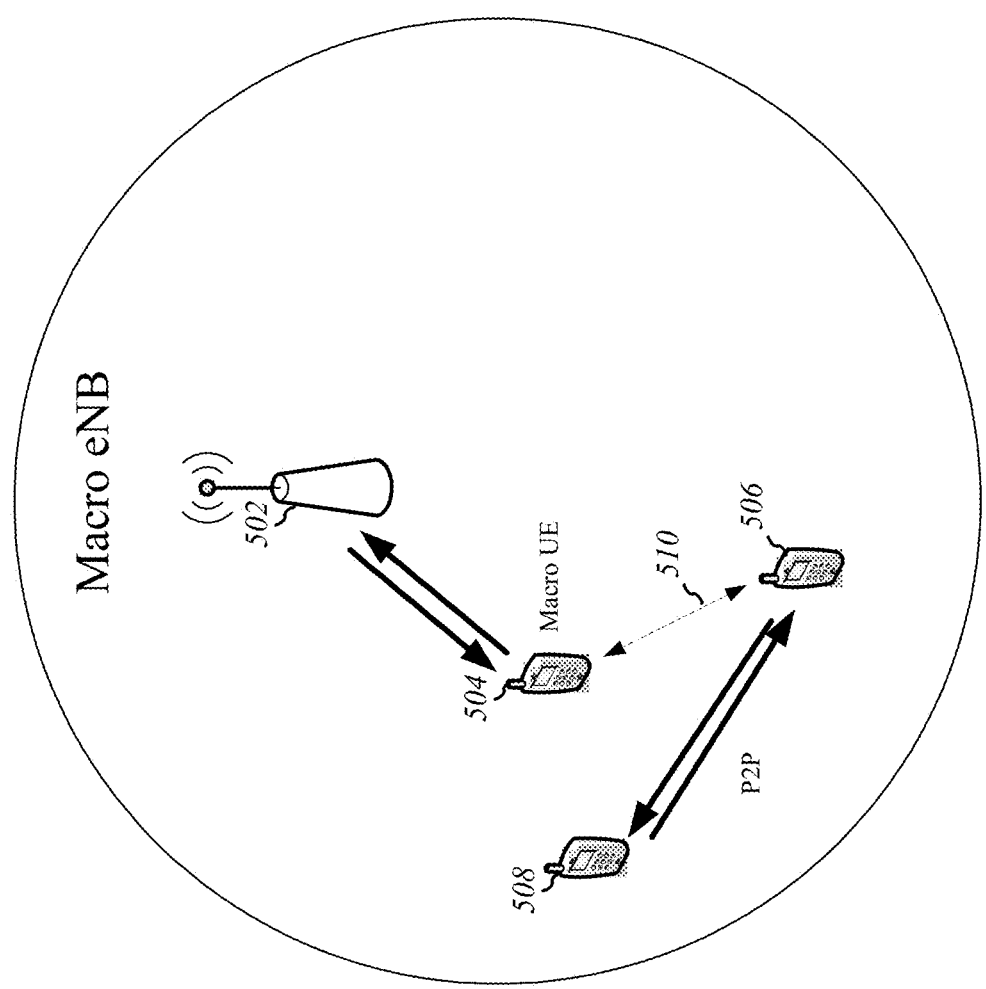
FIG. 5 is a block diagram conceptually illustrating an example of a telecommunications system.

A potential scenario for such interference is shown in FIG. 5. A macro cell, such as an eNodeB base station 502 may be serving a user equipment 504. In a nearby location, user equipments 506 and 508 may be engaged in peer-to-peer (P2P) communications, or similar communications on a different network from base station 502. In certain communication configurations, macro UE 504 and P2P UE 506 may cause interference 510 to each other. As another example, potentially interfering UEs may be operating on different macro cells. As yet another example, a UE communicating on a first RAT may be operating on a macro cell and a UE communicating on a second RAT may be operating on a small cell deployment. As still yet another example, a UE may be communicating on a first RAT such as WiFi and another UE may be communicating on a second RAT, such as a Long Term Evolution (LTE) macro cell. Finally, the first and second RAT may also belong to the same operator or different operators. It should be noted that a RAT may be a user equipment (UE), eNodeB (eNB), access point, or other device operating in a wireless communication system. It should also be noted that this disclosure is not limited to the examples of the various RATs described above.

In one aspect, the potential interference between devices may be categorized as at least two different types of interference. The first type of interference may be synchronous interference and the second type of interference may be asynchronous interference.

Synchronous interference may occur when the two RATs are synchronized, for example, two LTE-TDD networks may be deployed adjacent to each other and they may be synchronized on a superframe level.

Asynchronous interference may occur when the two RATs are not synchronized. For example, a first RAT may be communicating using WiFi and the second RAT may be communicating with LTE, and therefore, the first RAT and the second RAT may be unsynchronized. Alternatively, for example, the first and second RATs may both be using LTE implementations that are not synchronized with each other. Moreover, asynchronous interference may occur as a result of different air-inference and may occur at a random time that results in bursty interference. Specifically, in some communication systems, interference sources may be bursty in nature, such that the interference may be present over a limited time of the entire desired signal.

Proposed are solutions to the potential interference scenarios discussed above. The solutions described herein may be incorporated on their own or together, and may be combined in whole or in part with those discussed in co-owned Provisional Patent Application No. 61/559,466 filed Nov. 14, 2011 in the names of BHATTAD, et al., the content of which is hereby expressly incorporated by reference in its entirety.

For purposes of illustration in the following discussion, unless otherwise noted, it is assumed that the two RATs are TDD networks and the interference is between two UEs. Specifically, an aggressor (the UE causing the UE to UE interference) is said to be connected to an aggressor eNodeB. A victim (the UE experiencing the UE to UE interference) is said to be connected to a victim eNodeB. The victim eNodeB and aggressor eNodeB may communicate over a backhaul or similar communication channel to share TDD configurations as well as information regarding potential UE to UE interference experienced by each of the eNodeBs respective UEs. It should be noted that the aggressor and victim are not limited to UEs and may be other devices, such as an eNodeB or an Access Point, that operate in a wireless communication system.

Power Control

According to one aspect, a potential solution to the interference scenarios described above is to utilize a power control method. In a baseline scenario, when a receiver experiences interference, the receiver may request for the transmitter to increase the transmission power in an attempt to overcome the interference at the receiver. However, the interference may be bursty, such that the increased transmission power may be desired at the specific times when the interference is present, and therefore, a constant increase in transmission power may cause additional interference as a result of the increased transmission power and may also consume more power, thereby decreasing the battery level of a device.

Thus, in this aspect, a power control method may be utilized according to statistics and data that indicate when interference may be present. In other words, because of potential communication/synchronization between the two networks, the victim may know when there will be interference from the aggressor. Therefore, the power control method may utilize two power control loops, a first loop for times when interference may be present and a second power control loop for times when interference may not be present. More specifically, one power control loop may be employed during uplink transmissions of a victim and use statistics for the noise floor and interference measured during the uplink and another power control loop may be used during the downlink transmissions of a victim and use statistics for the noise floor and interference measured during the downlink.

For example, according to this aspect, a victim may utilize a first power control loop to increase a transmission power level when there may be interference, such as when an aggressor is transmitting. The victim may utilize a second power control loop that lowers the transmission power of the transmitter when there may be reduced interference, such as when the aggressor is receiving. In this example, the victim may receive information to indicate that the potential interference may be caused when the aggressor is transmitting and there may be reduced potential interference when the aggressor is receiving. Furthermore, because the victim and aggressor may be in a synchronous system, the victim may have information regarding the times when the aggressor is transmitting and the times when the aggressor is receiving, and therefore the victim may adjust a power level accordingly.

Rate Control

According to another aspect, a potential solution to the interference scenarios described above is to utilize a rate control system. In this aspect, a transmitter controls a rate and modulation of a packet format that may be transmitted to a receiver. The transmitter may take into account a channel quality indicator (CQI), a received signal strength indicator (RSSI), a signal to interference plus noise ratio (SINR), or other metric of the receiving side when controlling the rate and modulation of the packet format.

In a typical rate control system, a CQI may be sent from a receiver, such as a wireless device, to a transmitter, such as a base station, to provide the transmitter with channel quality information. The transmitter may then choose the rate for data transmission to the receiver based on the receiver's CQI. When faced with a rapidly changing CQI, such as for a receiver facing bursty interference, the transmitter may receive a CQI indicating a good SINR and a bad SINR, and may calculate a rate for data transmission based on an average of the received SINRs. This may lead to suboptimal performance, however, because setting a data transmission rate based on the average channel will result in poor performance when the bursty interference is active (the interference resulting in a below average channel) and may lead to unused channel capacity when the bursty interference is active (the lack of interference resulting in an above average channel).

Thus, in this aspect, a rate control system may utilize two rate control loops that take into account the bursty interference and different interference levels during uplink and downlink transmissions. In other words, a first rate control loop may be utilized when bursty interference may be present and a second rate control loop may be utilized when bursty interference may not be present.

In this aspect, when the victim and aggressor are operating in a synchronous system, the transmitter may be aware of times when bursty interference may be present, such as during a transmission from the aggressor, and times when bursty interference may not be present, such as during a time when the aggressor is receiving. Thus, the transmitter may select an appropriate modulation and coding scheme associated with a specific rate control loop according to when the bursty interference may be present.

Additionally, in another aspect, in either a synchronous system or an asynchronous system, a transmitter may select an appropriate modulation and coding scheme associated with a specific rate control loop based on at least one of a good CQI, a bad CQI, or an interference duty cycle between the good CQI and bad CQI. Specifically, the transmitter utilizes the information received from the receiver to determine the cycle or probability of a bursty transmission, and then selects an appropriate modulation and coding scheme associated with a specific rate control loop based on the determined cycle or probability of the bursty transmission.

For example, the transmitter may receive a good CQI, a bad CQI, and a duty cycle from the receiver or other entity. The transmitter may then use the received information to select a modulation and coding scheme for the first packet transmission. According to another example, the transmitter may use a hybrid automatic repeat request (HARQ) process to determine the modulation and coding scheme for the first transmission and a number of re-transmission to achieve a target packet error rate. The target packet error rate may refer to a target termination for HARQ.

In this aspect, according to one example, the transmitter may transmit at a rate for the good CQI when the duty cycle of the interference is less than or equal to a threshold. Additionally, according to this example, the transmitter may transmit at a rate for the bad CQI when the duty cycle of the interference is greater than or equal to a threshold.

According to another aspect, the transmitter may select a transmission rate that is greater than a rate that may be for a good CQI in an attempt to target a late termination for successfully delivering a packet.

Bandwidth Restriction

According to yet another aspect, a potential solution to the interference scenarios described above is to restrict an aggressor's bandwidth assignment when the aggressor's transmission power exceeds a threshold when the victim is receiving a transmission.

For example, when a victim is receiving a transmission, if an aggressor is transmitting at a transmission power that exceeds a threshold, such as $P_{high}$, the aggressor may restrict its bandwidth to a part of the aggressor communication channel away from the victim's receiving channel. Accordingly, by restricting the bandwidth to a part of the aggressor channel shifted from the victim channel, the aggressor may create a pseudo-guard band to reduce interference from the aggressor's utilization of the channel.

As another example, in this aspect, when the aggressor transmits with a transmission power that is equal to or greater than $P_{high}$, the aforementioned transmission may be restricted to times when the victim is not receiving. In other words, the transmission may be restricted to time when the victim is transmitting.

Smart Link Scheduling

According to still yet another aspect, a potential solution to the interference scenarios described above is to utilize smart link scheduling. In a typical wireless network there may be intra-system interference, such as interference from nodes operating on the same channels in the system. The wireless systems may attempt to control the intra-system interference by controlling the interference over thermal (IoT) level that determines the total interference observed from others nodes in the same network. It is understood that the IoT level may determine the transmission power level used by other devices to achieve a target signal to interference plus noise ratio (SINR). Thus altering the IOT level indirectly controls the transmission power level.

For example, a wireless system may determine that the IoT level may be 10 dB, thus the nodes within the wireless system may be transmitting at a power level that may cause a 10 dB increase in the thermal. Thus, when the IoT increases, a higher transmission power may be desired in order to overcome interference.

In one aspect, to overcome a potential interference, a wireless network associated with an aggressor may operate at a lower IoT when the victim device is receiving a transmission. Specifically, the aggressor may operate at a lower transmission power as a result of the lowered IoT, and therefore the victim may overcome the potential interference that may be present when receiving. Alternatively, the wireless system may lower the IoT when a transmitter, such as an eNodeB, associated with the victim is transmitting, because when the transmitter is transmitting the victim may potentially be receiving the transmission from the transmitter. Furthermore, the wireless system may increase the IoT when the victim is transmitting because the increased transmission power of the aggressor may not cause a potential interference when the victim is transmitting.

Therefore, according to this aspect, the smart link scheduling may operate under two loops. A first loop may lower an IoT of a wireless system associated with an aggressor when a victim may be receiving a transmission or when a transmitter associated with the victim is transmitting. Furthermore, a second loop may increase an IoT of the wireless system associated with the aggressor when the victim may be transmitting.

Interference Detection

The aspects discussed above may be applied to limit an aggressor's transmission power or bandwidth in order to protect a potential victim. However, there may be a probability that there is no nearby victim, and therefore, the aspects to limit an aggressor's transmission power or bandwidth may result in an undesired loss of performance for the aggressor's network. Thus, it may be useful to provide a technique for the aggressor to detect a presence of a victim and use the discussed aspects to limit an aggressor's transmission power or bandwidth when the victim is within a threshold distance to the aggressor.

In this aspect, according to one solution, the aggressor may measure the received RSSI of the victim when the victim is transmitting. The aggressor may then determine if the victim is nearby based on the received RSSI measured at the aggressor from the victim's transmission. A strong RSSI may indicate that the victim is nearby while a weak RSSI may indicate that the victim is not nearby.

Furthermore, in this aspect, according to another solution, the aggressor may measure an emission profile of a victim when the victim is transmitting. The aggressor may then estimate a transmission power level of a victim based on the observed non-linear emission profile and may then determine if the victim is nearby. Specifically, when a victim is transmitting at a high power the non-linearity may be high and the non-linearity reduces as the transmission power of the victim is reduced. The non-linearity measurements may aide the aggressor in estimating the path loss to the victim.

Finally, in this aspect, according to yet another solution, the aggressor may measure the RSSI of the victim eNodeB and use the RSSI to determine a link quality of a victim. Specifically, based on the RSSI, the aggressor may determine that it is close to an eNodeB, and therefore, a nearby device will have a good link quality. Thus, because the nearby device may have a good link quality, the aggressor may be less aggressive in reducing a power level or implementing bandwidth restriction. Moreover, when the aggressor determines that the eNodeB is far, a nearby device may likely have a poor link quality, and therefore, the aggressor UE may have to utilize a higher power restriction or bandwidth restriction.

Figure 6:
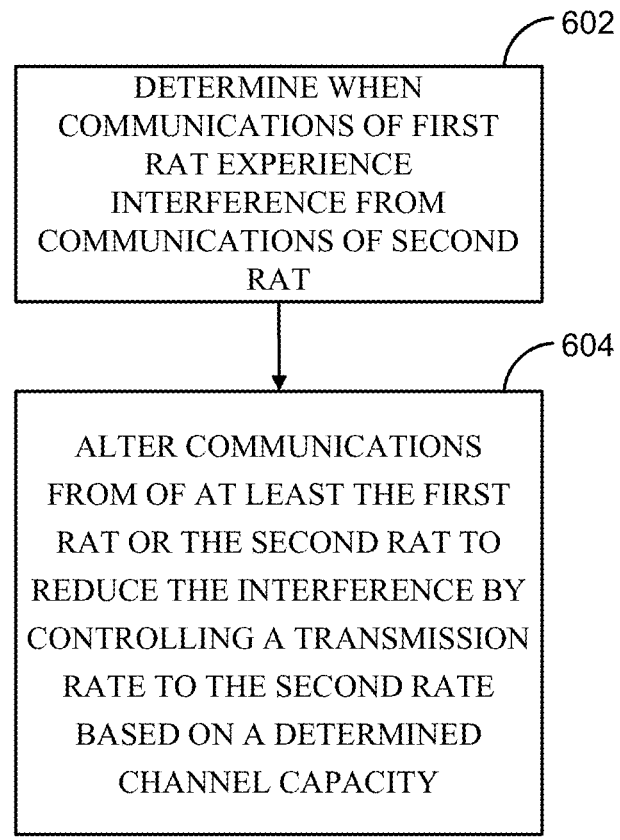
FIG. 6 is a block diagram illustrating a method for mitigating cross device interference according to one aspect of the present disclosure.

FIG. 6 illustrates a method of avoiding interference to a RAT according to one aspect of the present disclosure. As shown in FIG. 6, a device in a wireless system, such as first RAT or a second RAT, that may be at least a UE, eNodeB, or an Access Point, may determine when communications of a first RAT experience interference from communications of a second RAT as shown in block 602, and may alter the communications of at least the first RAT or the second RAT to reduce the interference, as shown in block 604. Altering the communications may include controlling a transmission rate to the second RAT based at least on a determined channel capacity.

Figure 7:
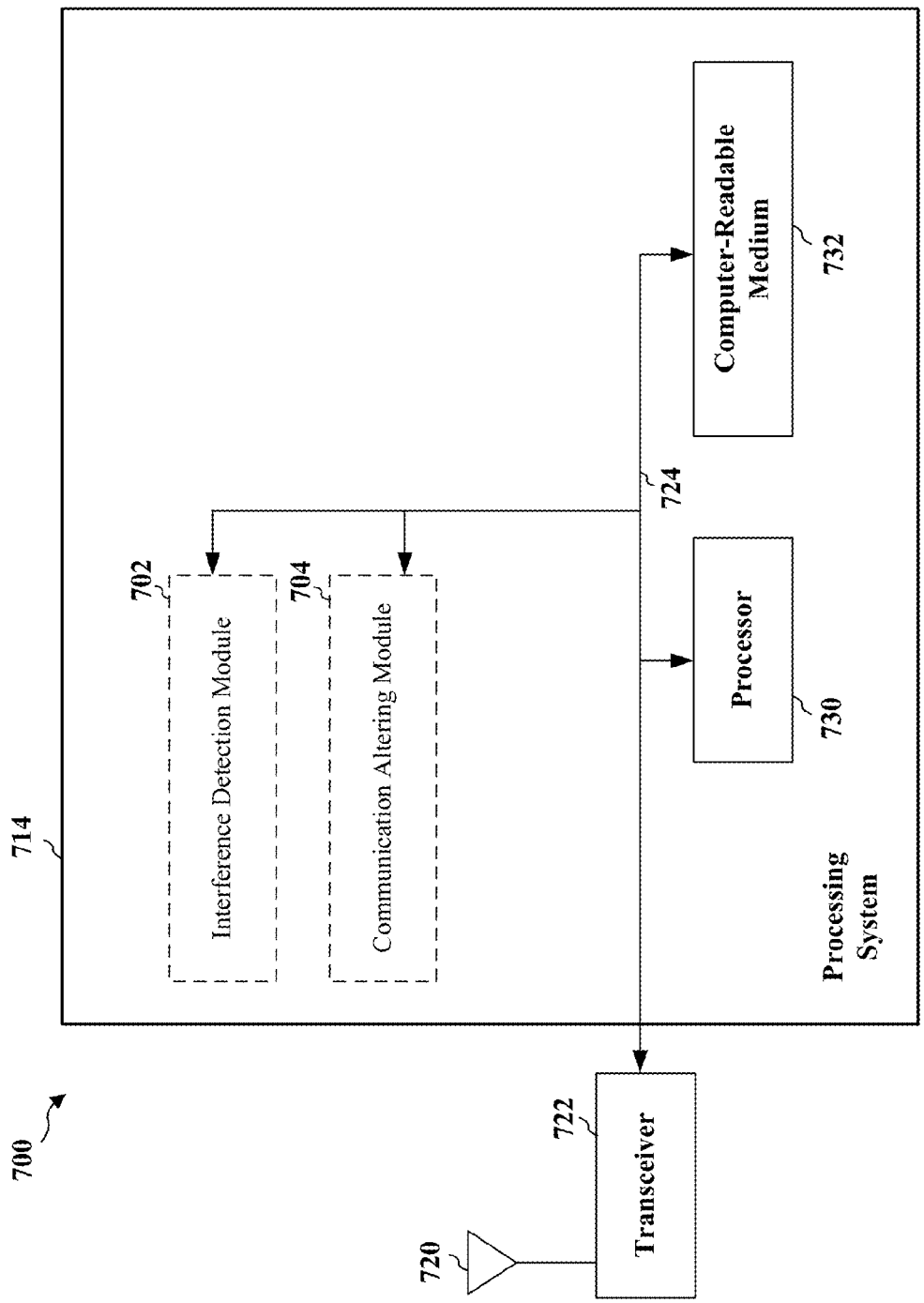
FIG. 7 is a block diagram illustrating components for mitigating cross device interference according to one aspect of the present disclosure.

FIG. 7 is a diagram illustrating an example of a hardware implementation for an apparatus 700 employing a processing system 714. The apparatus 700 may include an interference detection module 702 and a communication altering module 704. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 730, the interference detection module 702, and communication altering module 704, and the computer-readable medium 732. The bus 724 may also link various other circuits such as timing sources, peripherals, voltage regulators, and power management circuits, which are well known in the art, and therefore, will not be described any further.

The apparatus includes a processing system 714 coupled to a transceiver 722. The transceiver 722 is coupled to one or more antennas 720. The transceiver 722 provides a means for communicating with various other apparatus over a transmission medium. The processing system 714 includes a processor 730 coupled to a computer-readable medium 732. The processor 730 is responsible for general processing, including the execution of software stored on the computer-readable medium 732. The software, when executed by the processor 730, causes the processing system 714 to perform the various functions described above for any particular apparatus. The computer-readable medium 732 may also be used for storing data that is manipulated by the processor 730 when executing software. The processing system 714 further includes the interference detection module 702 for determining when communications of a first radio access technology (RAT) experience interference from communications of a second RAT. The processing system 714 further includes the communication altering module 704 altering the communications of at least the first RAT or the second RAT to reduce the interference, in which the altering comprises controlling a transmission rate to the second RAT based at least on a determined channel capacity. The modules may be software modules running in the processor 730, resident/stored in the computer readable medium 732, one or more hardware modules coupled to the processor 730, or some combination thereof. The processing system 714 may be a component of the eNodeB 110 and may include the memory 442 and/or at least one of the TX MIMO processor 430, transmit processor 420, the receive processor 438, and the controller/processor 440. The processing system 714 may be a component of the UE 120 and may include the memory 660 and/or at least one of the TX MIMO processor 466, transmit processor 464, the receive processor 458, and the controller/processor 480.

In one configuration, the apparatus 700 for wireless communication includes means for determining and means for altering. The aforementioned means may be one or more of the aforementioned modules of the apparatus 100 and/or the processing system 714 of the apparatus 700 configured to perform the functions recited by the aforementioned means. As described above, the processing system 714 may include the interference detection module 702, communication altering module 704, TX MIMO processor 430, transmit processor 420, the receive processor 438, and the controller/processor 440. As such, in one configuration, the aforementioned means may be the interference detection module 702, communication altering module 704, TX MIMO processor 430, transmit processor 420, the receive processor 438, and the controller/processor 440 configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining when communications of a first device using a first radio access technology (RAT) experience interference from communications of a second device using a second RAT;
   receiving, from the first device, information regarding a first channel quality when experiencing the interference, information regarding a second channel quality when not experiencing the interference, and a duty cycle of a length of time of the interference;
   determining a channel capacity based on the information regarding the first and second channel quality and the duty cycle; and
   altering the communications of the second device to reduce the interference, in which the altering comprises controlling a transmission rate to the second device based at least on the determined channel capacity.

2. The method of claim 1, further comprising:
   setting a target number (M) of retransmissions; and
   determining a code rate of a packet such that the packet is decoded by a user equipment (UE) at least at or before an Mth transmission of the packet.

3. The method of claim 1, further comprising restricting a bandwidth assignment of the second RAT to a part of a first channel of the second RAT farther away from a second channel of the first RAT when a transmission power of the second RAT exceeds a threshold.

4. The method of claim 1, further comprising determining a proximity of the first device to the second device.

5. The method of claim 4, in which the altering comprises altering the communications when the proximity is within a threshold.

6. The method of claim 1, in which the altering comprises altering an interference level that determines a total interference from one or more RATs.

7. The method of claim 6, in which altering the interference level comprises increasing the interference level via a first loop or decreasing the interference level via a second loop.

8. The method of claim 1, in which the altering is based at least in part on a result of performing an interference measurement to detect the interference.

9. The method of claim 1, in which the controlling the transmission rate comprises transmitting at a rate for the first channel quality when the duty cycle of the interference is less than or equal to a threshold and transmitting at a rate for the second channel quality when the duty cycle of the interference is greater than or equal to a threshold.

10. A non-transitory computer-readable medium having program code recorded thereon, the program code comprising:
    program code to determine when communications of a first device using a first radio access technology (RAT) experience interference from communications of a second device using a second RAT;
    program code to receive, from the first device, information regarding a first channel quality when experiencing the interference, information regarding a second channel quality when not experiencing the interference, and a duty cycle of a length of time of the interference;
    program code to determine a channel capacity based on the information regarding the first and second channel quality and the duty cycle; and
    program code to alter the communications of the second device to reduce the interference, in which the altering comprises controlling a transmission rate to the second device based at least on the determined channel capacity.

11. The non-transitory computer-readable medium of claim 10, further comprising program code to restrict a bandwidth assignment of the second RAT to a part of a first channel of the second RAT farther away from a second channel of the first RAT when a transmission power of the second RAT exceeds a threshold.

12. The non-transitory computer-readable medium of claim 10, in which the program code further comprises program code to determine a proximity of the first device to the second device, and in which the program code to alter comprises program code to alter the communications when the proximity is within a threshold.

13. The non-transitory computer-readable medium of claim 10, in which the program code to control the transmission rate comprises program code to transmit at a rate for the first channel quality when the duty cycle of the interference is less than or equal to a threshold and transmit at a rate for the second channel quality when the duty cycle of the interference is greater than or equal to a threshold.

14. An apparatus for wireless communication, comprising:
    a memory; and
    at least one processor coupled to the memory, the at least one processor being configured:
       to determine when communications of a first device using a first radio access technology (RAT) experience interference from communications of a second device using a second RAT;
       to receive, from the first device, information regarding a first channel quality when experiencing the interference, information regarding a second channel quality when not experiencing the interference, and a duty cycle of a length of time of the interference;
       to determine a channel capacity based on the information regarding the first and second channel quality and the duty cycle; and
       to alter the communications of the second device to reduce the interference, in which the altering comprises controlling a transmission rate to the second device based at least on the determined channel capacity.

15. The apparatus of claim 14, in which the at least one processor is further configured to restrict a bandwidth assignment of the second RAT to a part of a first channel of the second RAT farther away from a second channel of the first RAT when a transmission power of the second RAT exceeds a threshold.

16. The apparatus of claim 14, in which the at least one processor is further configured to determine a proximity of the first device to the second device, and in which the at least one processor is further configured to alter the communications by altering the communications when the proximity is within a threshold.

17. The apparatus of claim 14, in which the at least one processor is further configured to alter the communications by altering an interference level that determines a total interference from one or more RATs.

18. The apparatus of claim 17, in which the at least one processor is further configured to alter the interference level by increasing the interference level via a first loop or decreasing the interference level via a second loop.

19. The apparatus of claim 14, in which the at least one processor is further configured to alter the communications based at least in part on a result of performing an interference measurement to detect the interference.

20. The apparatus of claim 14, in which the at least one processor is further configured to control the transmission rate by transmitting at a rate for the first channel quality when the duty cycle of the interference is less than or equal to a threshold and transmitting at a rate for the second channel quality when the duty cycle of the interference is greater than or equal to a threshold.

21. An apparatus for wireless communication, comprising:
means for determining when communications of a first device using a first radio access technology (RAT) experience interference from communications of a second device using a second RAT;
means for receiving, from the first device, information regarding a first channel quality when experiencing the interference, information regarding a second channel quality when not experiencing the interference, and a duty cycle of a length of time of the interference;
means for determining a channel capacity based on the information regarding the first and second channel quality and the duty cycle; and
means for altering the communications of the second device to reduce the interference, in which the altering comprises controlling a transmission rate to the second device based at least on the determined channel capacity.

22. The apparatus of claim 21, further comprising means for restricting a bandwidth assignment of the second RAT to a part of a first channel of the second RAT farther away from a second channel of the first RAT when a transmission power of the second RAT exceeds a threshold.

23. The apparatus of claim 21, further comprising means for determining a proximity of the first device to the second device, and in which the altering means further comprises means for altering the communications when the proximity is within a threshold.

24. The apparatus of claim 21, in which the controlling the transmission rate comprises transmitting at a rate for the first channel quality when the duty cycle of the interference is less than or equal to a threshold and transmitting at a rate for the second channel quality when the duty cycle of the interference is greater than or equal to a threshold.

* * * * *